Figure 1:
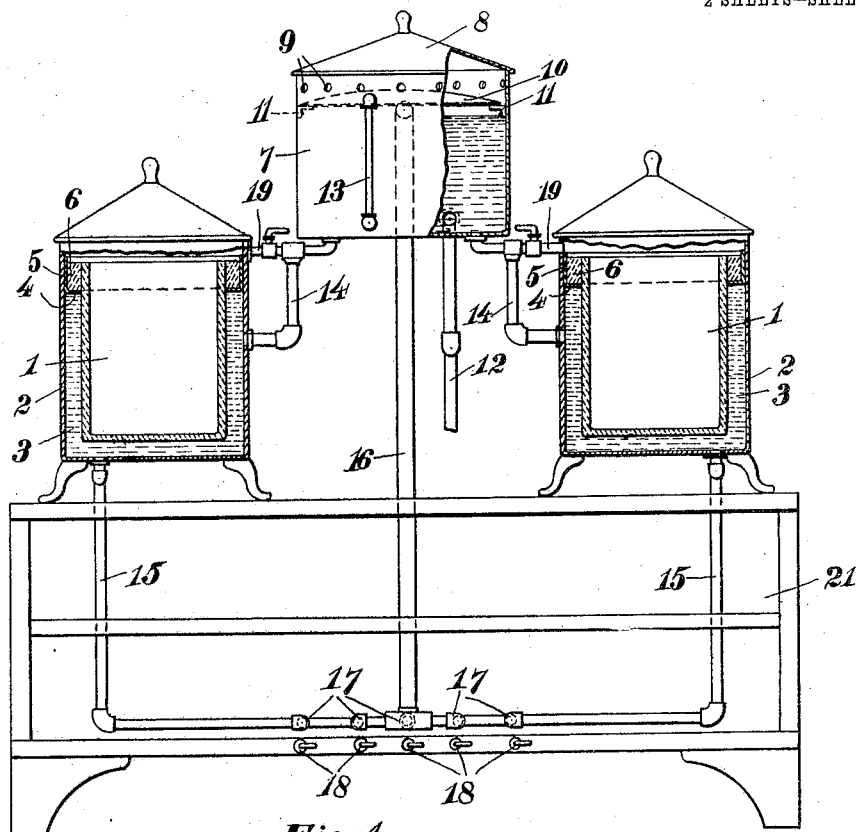

No. 893,700. PATENTED JULY 21, 1908.
J. H. BECKMAN.
COFFEE URN.
APPLICATION FILED JAN. 20, 1908.

2 SHEETS—SHEET 1.

Witnesses:

Inventor;
John H. Beckman
by
Joshua R. H. Potts
Atty.

No. 893,700. PATENTED JULY 21, 1908.
J. H. BECKMAN.
COFFEE URN.
APPLICATION FILED JAN. 20, 1908.

2 SHEETS—SHEET 2.

Witnesses:
O. A. Olson
H. S. Austin

Inventor:
John H. Beckman
by
Joshua R. H. Potts
Atty.

UNITED STATES PATENT OFFICE.

JOHN H. BECKMAN, OF CHICAGO, ILLINOIS.

COFFEE-URN.

No. 893,700. Specification of Letters Patent. Patented July 21, 1908.

Application filed January 20, 1908. Serial No. 411,667.

*To all whom it may concern:*

Be it known that I, JOHN H. BECKMAN, a citizen of the United States, residing at Chicago, county of Cook, and State of Illinois, have invented certain new and useful Improvements in Coffee-Urns, of which the following is a specification.

My invention relates to coffee urns and particularly to coffee urns especially designed for use in restaurants or lunch rooms. Coffee urns of this class, as are now in general use, comprise a jacketed receptacle for the coffee and a water reservoir or boiler. A valved pipe leads from the boiler to the coffee receptacle for replenishing the same, and a valved branch pipe leads to the jacket space for maintaining the same substantially full of supposedly hot water. The receptacle or boiler is usually on a level with the coffee receptacle, hence, in order to supply the receptacle and the jacket with water, the boiler is kept constantly under steam pressure while in use. Serious accidents have occurred with devices of this character due to clogging or sticking of the safety valve, resulting in either an explosion or collapsing of the boiler. The water in the jacket space surrounding the lower portion of the coffee receptacle is usually kept hot by a supplementary heater and the water as it evaporates is replaced by water from the boiler. The water in the jacket soon becomes foul and as the steam from the jacket readily passes into the coffee receptacle the coffee absorbs the obnoxious and unwholesome vapors rising therefrom.

The object of my invention is to provide a coffee urn of such improved construction that water may be supplied from the boiler to the coffee receptacle and its surrounding jacket without necessitating maintaining the steam pressure in the boiler, to avoid either explosion or collapsing of the boiler.

A further object of my invention is to provide a coffee urn in which water therein, especially that in the water jacket shall be maintained sweet, pure and wholesome.

A further object of my invention is to provide a coffee urn as mentioned in which the water in the jacket surrounding the coffee receptacle may be kept heated to the proper temperature without necessitating the use of a separate heater.

A further object of my invention is to provide a coffee urn so constructed and arranged that the otherwise wasted heat from its heater may be employed for other purposes. Other objects will appear hereinafter.

Figure 2:
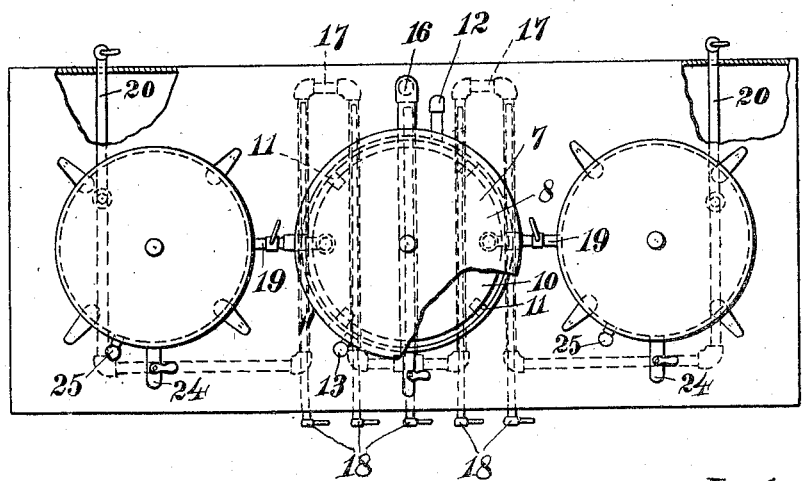
Figure 3:
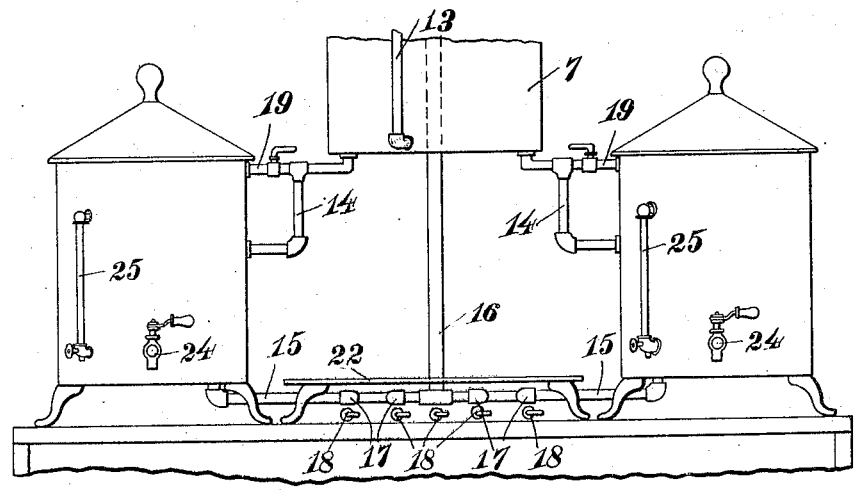
Figure 5:
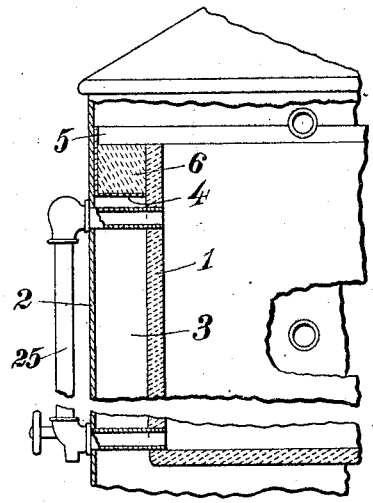
Figure 6:
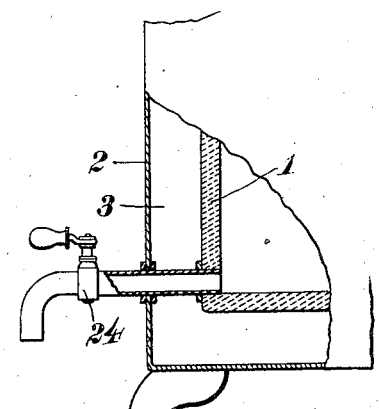
Figure 4:
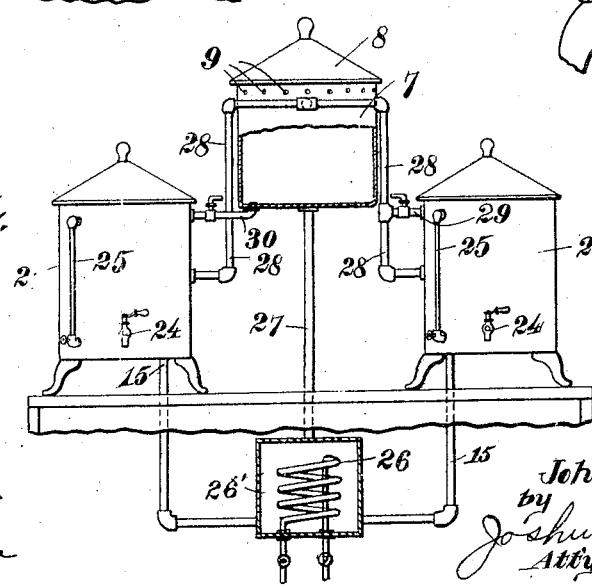

My invention will be more readily understood by reference to the accompanying drawings forming a part of this specification and in which, Figure 1 is an elevation, partially in section, of a device embodying my invention in its preferred form. Fig. 2 is a plan view thereof. Fig. 3 is a detail elevation of a slightly modified form, Fig. 4 is a detail of a further modification, and Figs. 5 and 6 are details upon an enlarged scale of the jacketed coffee receptacles.

In the drawings, I have illustrated two coffee receptacles in combination with a single water reservoir but wish it understood that one or any number thereof may be employed without departing from the scope of my invention.

Referring to the drawings, 1 indicates the coffee receptacle, and 2 the jacket which is somewhat larger in diameter forming the jacket space, 3. The receptacle, 1 is preferably formed of earthen ware and the jacket, 2 of metal and suitable means are provided for connecting them to form a tight joint at the top of the jacket space. To this end, the member, 1 is surrounded at its upper end by an annular metal member comprising the substantially horizontal portion, 4 which extends from the side thereof to the jacket, 2 and the vertical portion, 5 which fits close against the jacket, 2. The annular recess formed between the upper edge of the vessel, 1 and the annular metal member is filled with cement, 6 which, when set, unites the same. The vertical portion, 5 extends a short distance above the cement and constitutes a flange whereby the coffee receptacle is secured to the jacket, 2 preferably by soldering. It is obvious that the water and vapor from the jacket space cannot pass into the coffee receptacle.

7 indicates the water reservoir. This preferably comprises a metal member arranged above the level of the jacket space, 3 and having a cover, 8. The sides of the reservoir near their upper edge are provided with a plurality of vent holes, 9 by means of which the pressure in the system is maintained constantly at atmospheric pressure, the same permitting the egress of steam while the device is in service and the ingress of air as the device cools. It is obvious that explosion or collapsing of the device is impossible. To prevent the escape of too much steam a false top or hood 10 is provided above the level of the water in the reservoir and slightly below the holes, 9. This is kept comparatively cool by the circulation through the upper portion of the device between it and the lid or cover, 8, and as the steam from the water rises it is in a large measure condensed by coming in contact therewith. The hood, 10 is of less diameter than that of the reservoir and is supported upon a plurality of ears or lugs extending from the side walls of the reservoir. The reservoir is filled from a pipe, 12 connected with the source of water supply and a water gage 13 is provided by which the height of the water in the reservoir may be determined.

Extending from the bottom of the reservoir, 7 to the jacket space, 3 is a pipe, 14. From the bottom of the jacket space the water passes by a pipe, 15 to a suitable heater and from thence, by a pipe, 16 to the reservoir, preferably above the level of the water therein. The heater comprises a coil of pipe, 17 beneath which is arranged the burners, 18 supplied with either gaseous or liquid fuel. The water is heated in the coil, 17 and rises through the pipe, 16 into the reservoir, 7 fresh and cooler water passing from the jacket space, 3 to the coil takes its place. In this way a constant circulation of hot water is maintained through the jacket space about the receptacle, 1 hence, there is no accumulation of foul water in the urn, nor is an auxiliary heater necessary for each coffee receptacle. Usually two coffee receptacles are employed, as illustrated in the drawings, in which case the pipes, 15 lead into opposite sides of the coil, 17 and the water is conducted thence by the pipe, 16 rising from the center of the coil. 19 indicates a valved pipe leading from the reservoir, 7, through the jacket, 2 above the connection between the receptacle, 1 and the jacket, that is, in a position to discharge into the coffee receptacle to replenish the same. To drain the system of water when desired, I provide the valved pipes, 20 leading from the lowest point in the system which is preferably between the jacket, 3 and the coil, 17.

As considerable heat from the burners, 18 is not absorbed by the water in the coils, 17, I provide means for utilizing the heat which would otherwise be lost. This heat may be utilized in several ways. In Fig. 1 I have illustrated one arrangement whereby it is used as a cup or plate warmer, the coil and the burners being arranged in the bottom of the cupboard, 21. In Fig. 3 I have illustrated an arrangement whereby said heat may be utilized for toasting bread, baking griddle cakes or the like. To this end, a plate or griddle iron may be arranged directly above the burner and the coils. The device is completed by the faucets, 24 for drawing off the coffee from the receptacle, 1 and the coffee gage, 25 for each receptacle.

Instead of the burners, 18 the water may be heated by steam and in some instances this may be preferable especially if the building is equipped with a plentiful supply of steam. In Fig. 4 I have illustrated a device thus heated. Referring to said figure, 26 indicates, a steam coil arranged within a tank, 26' and connected to a suitable source of steam supply. The water is heated in the tank which is preferably arranged beneath the reservoir, 7 and passes from the top thereof through a pipe, 27 to the bottom of the reservoir, 7 and passing from thence, by the pipes, 28, to the top of the jacket spaces, 3. From the jacket spaces, it passes by pipes, 15 to the tank 26' to be repeated. In this modification the coffee receptacle may be replenished through a valved pipe, 29 leading from the pipe 28 or from a similar pipe 30 leading directly from the reservoir, 7.

Having described my invention what I claim as new and desire to secure by Letters Patent is:

1. In a coffee urn, an earthenware coffee receptacle, and a metallic jacket surrounding the same, and extending somewhat above the upper edge of said receptacle, in combination with an annular metallic member comprising a substantially horizontal portion arranged below the upper edge of said receptacle and filling the space between the same and said jacket at that point, and a vertical portion fitting close to said jacket and extending above the edge of said receptacle, said vertical portion being soldered to said jacket and cement filling the space between said vertical portion and the upper end of said receptacle above the horizontal portion, and means for maintaining a constant circulation of hot water through said jacket space below said horizontal portion, substantially as described.

2. In a coffee urn, a coffee receptacle and a suitable jacket surrounding the same, in combination with a water reservoir arranged above the level of said jacket, a pipe leading from said reservoir to said jacket, means for sealing the upper end of said jacket, a pipe leading from said jacket back to said reservoir, a heater interposed in said pipe, and a valved pipe leading from said reservoir and discharging into said receptacle above the jacket seal, substantially as described.

3. In a coffee urn, a pair of coffee receptacles, and a jacket surrounding each of said receptacles, in combination with a reservoir arranged above said jackets, a pipe leading from said reservoir to each of said jackets, a pipe leading from each of said jackets, a heater interposed in each of the last said pipes and a common return pipe leading from said heaters to said reservoir, substantially as described.

4. A coffee urn comprising a coffee receptacle and a jacket surrounding the same, and means for sealing the upper end of the jacket space between said receptacle and said jacket, in combination with a reservoir arranged above the level of said jacket and connected thereto by a suitable pipe, a pipe leading from said jacket back to said reservoir, a heater interposed in said pipe, a hood arranged in said reservoir near the upper end thereof, said hood being of less diameter than said reservoir and said reservoir being perforated above said hood, substantially as described.

In testimony whereof I have signed my name to this specification in the presence of two subscribing witnesses.

JOHN H. BECKMAN.

Witnesses:
   HELEN F. LILLIS,
   HOWARD S. AUSTIN.